United States Patent [19]

Schilling

[11] 4,425,993
[45] * Jan. 17, 1984

[54] FLUID ENGAGED SPRING RELEASED FAN CLUTCH HAVING A MODULAR MOUNT FOR A SPRING ENGAGED FLUID RELEASED FAN CLUTCH

[75] Inventor: Hugh K. Schilling, St. Paul, Minn.

[73] Assignee: Horton Industries, Inc., Minneapolis, Minn.

[*] Notice: The portion of the term of this patent subsequent to Oct. 26, 1999 has been disclaimed.

[21] Appl. No.: 236,622

[22] Filed: Feb. 20, 1981

[51] Int. Cl.³ .................. F16D 13/44; F16D 25/063
[52] U.S. Cl. .................. 192/85 A; 192/91 A
[58] Field of Search .......... 192/85 A, 91 A, 82 T, 192/85 AA, 91 R

[56] References Cited

U.S. PATENT DOCUMENTS

| | | | |
|---|---|---|---|
| 2,502,798 | 4/1950 | Nabstedt et al. | 192/91 A |
| 2,661,148 | 12/1953 | Englander | 230/271 |
| 2,698,676 | 1/1955 | Eason | 192/91 A X |
| 2,927,563 | 3/1960 | Geiger | 192/85 AA X |
| 3,145,816 | 8/1964 | De Lorean et al. | 192/91 A |
| 3,306,407 | 2/1967 | Smirl | 192/85 AA |
| 3,446,430 | 5/1969 | Elmer | 230/271 |
| 3,805,931 | 4/1974 | Portmann | 192/91 A X |
| 3,880,265 | 4/1975 | Elmer | 192/82 T X |
| 3,887,051 | 6/1975 | Bignell | 192/85 AA |
| 4,238,017 | 12/1980 | Spokas | 192/91 A X |
| 4,245,724 | 1/1981 | Beck | 192/91 A X |
| 4,304,321 | 12/1981 | Wong | 192/85 A X |
| 4,312,433 | 1/1982 | Bopp | 192/82 T X |

FOREIGN PATENT DOCUMENTS

| | | |
|---|---|---|
| 229910 | 10/1959 | Australia . |
| 230716 | 10/1959 | Australia . |
| 293130 | 10/1966 | Australia . |
| 53506 | 2/1974 | Australia . |
| 1115729 | 5/1963 | United Kingdom . |
| 2036202 | 6/1980 | United Kingdom . |

OTHER PUBLICATIONS

Page No. N-12 of British Leyland Manual for Morris, 1500-1300 Vehicles which was OPI on 6/6/78.

Primary Examiner—Rodney H. Bonck
Attorney, Agent, or Firm—Wicks & Nemer

[57] ABSTRACT

A fluid engaged spring released fan clutch having a modular mount usable with a spring engaged fluid released fan clutch is shown according to the teachings of the present invention. The modular unit includes a friction disc and a first outer shell section rotatably mounted thereto. The fluid engaged clutch portion includes a second shell section having an annular cylinder formed therein. A piston having a friction ring mounted thereon is reciprocably received on the annular cylinder and biased by spring means mounted between the piston and the modular mount. A rotary union is mounted on the second shell section for conduction of fluid pressure to cause the piston to move and engage with the friction disc. The spring engaged clutch portion includes a second shell section having a cylindrical plate held in a spaced relation therefrom. A piston having a friction ring mounted thereon is reciprocably received on the cylindrical plate and is biased by springs mounted between the piston and the second shell section. A rotary union is mounted on the second shell section for conducting fluid pressure to cause the piston to move and disengage with the friction disc. A series of fan blades are carried by the shell sections in the most preferred embodiments of the clutches of the present invention.

13 Claims, 6 Drawing Figures

FLUID ENGAGED SPRING RELEASED FAN CLUTCH HAVING A MODULAR MOUNT FOR A SPRING ENGAGED FLUID RELEASED FAN CLUTCH

SUMMARY

The invention relates to an improvement in clutches and more particularly to a fan clutch for a vehicle. It is an object of the invention to provide a fan clutch which derives its axial rigidity and stability by virtue of the axially directed clamping forces of the actuator, either spring set actuated or fluid set actuated. The generally accepted method or practice of attaining the axial stability is through the utilization of spaced bearing supports which requires extended axial envelopes. It is an object of the invention to provide a clutch construction providing axial stability with a single bearing which brings simplicity and economy of manufacture together with compactness and a single O-ring in the spring engaged version.

It is an additional object of the invention to provide a clutch construction which provides the axial stability at a time when it is needed, i.e. when the fan blades are rotated at a relatively high speed as opposed to the luxury of the aforementioned double bearing construction. Generally speaking, the time of engaged rotation of a fan clutch has been found to be in the neighborhood of six to ten percent of the total operating time of the vehicle, and with the construction herein presented axial stability is provided during that time.

It is a still further object of the invention to provide a fan clutch which has a modular component useable either with a fluid engaged or spring engaged clutch construction herein disclosed which provides the user with an option and the manufacturer with flexibility to easily and economically provide the option. The module not only provides the option and flexibility but also the single bearing axial rigidity previously alluded to.

It is a still further object of the invention to provide a clutch having a construction allowing a single bearing to provide rigidity and stability which braces the outer race of the bearing by supporting the outer shell through the clutch interface when engaged by directing load forces back to the friction disc which in turn is directly connected to the rigid support, namely the shaft that mounts the entire clutch unit.

In the drawings forming part of this appliation.

Figure 1:
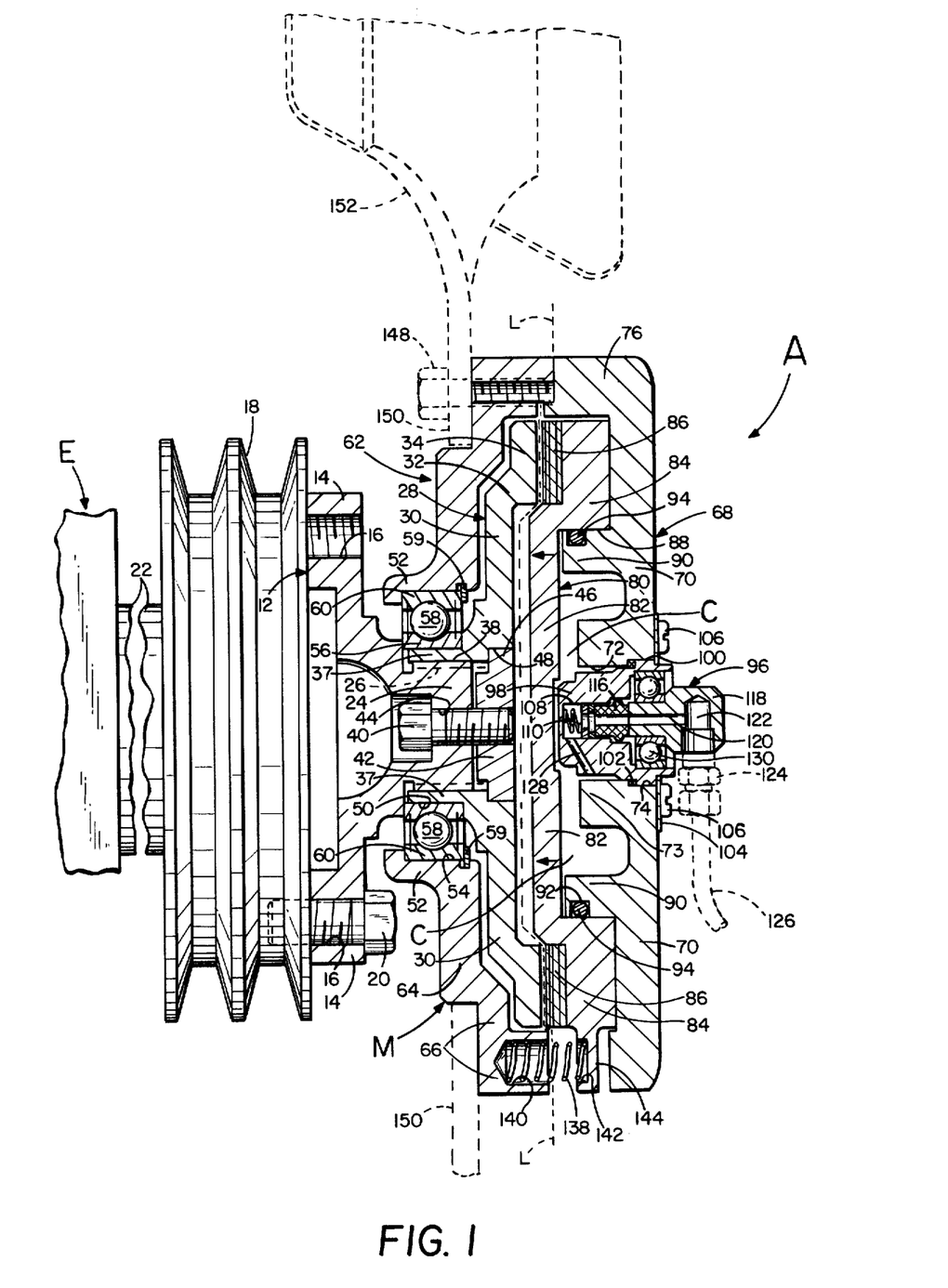
FIG. 1 is a sectional view on the line 1—1 of FIG. 3 of a fluid engaged spring released fan clutch embodying the invention with a portion of a fan blade shown in phantom outline, the rotary air union included and the clutch in a disengaged condition.
Figure 2:
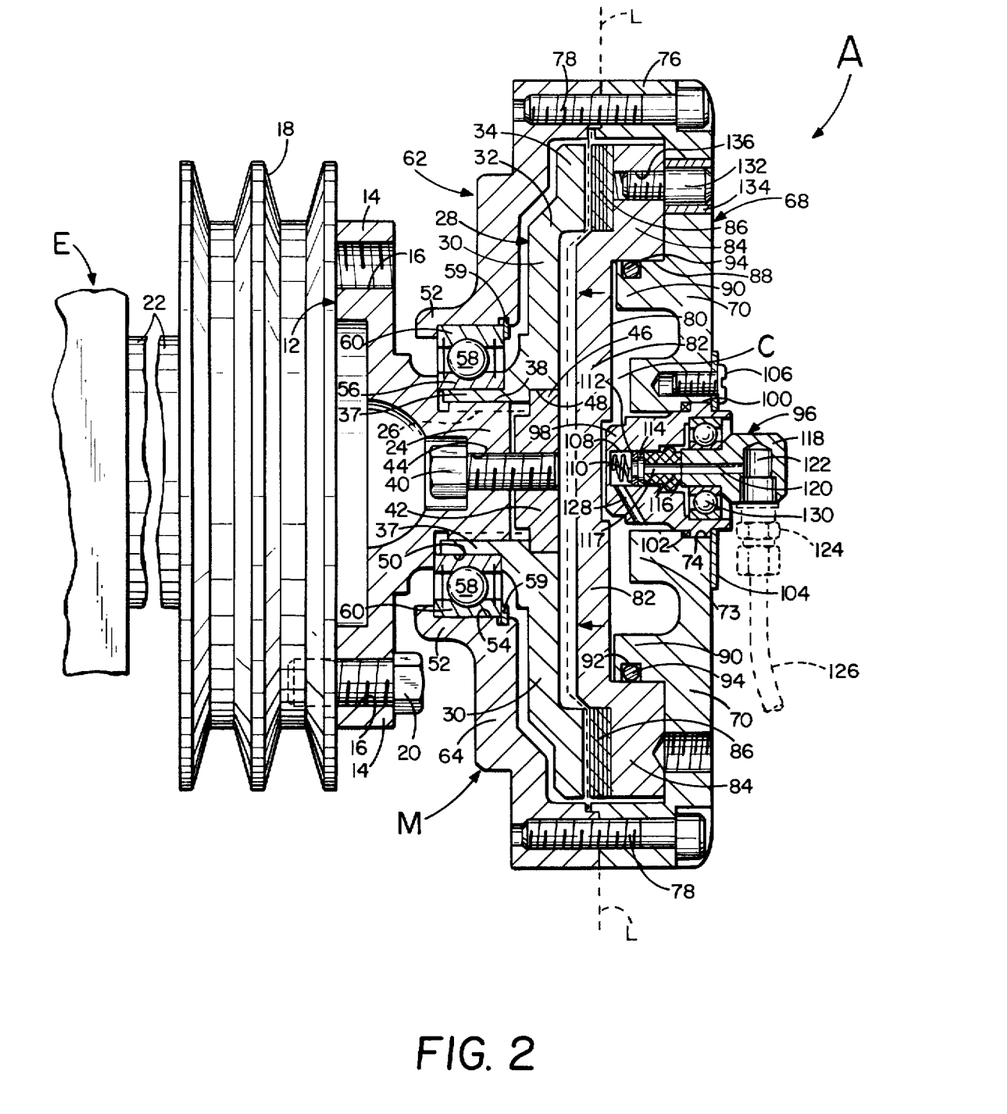
FIG. 2 is a sectional view on the line 2—2 of FIG. 3 similar to FIG. 1.
Figure 3:
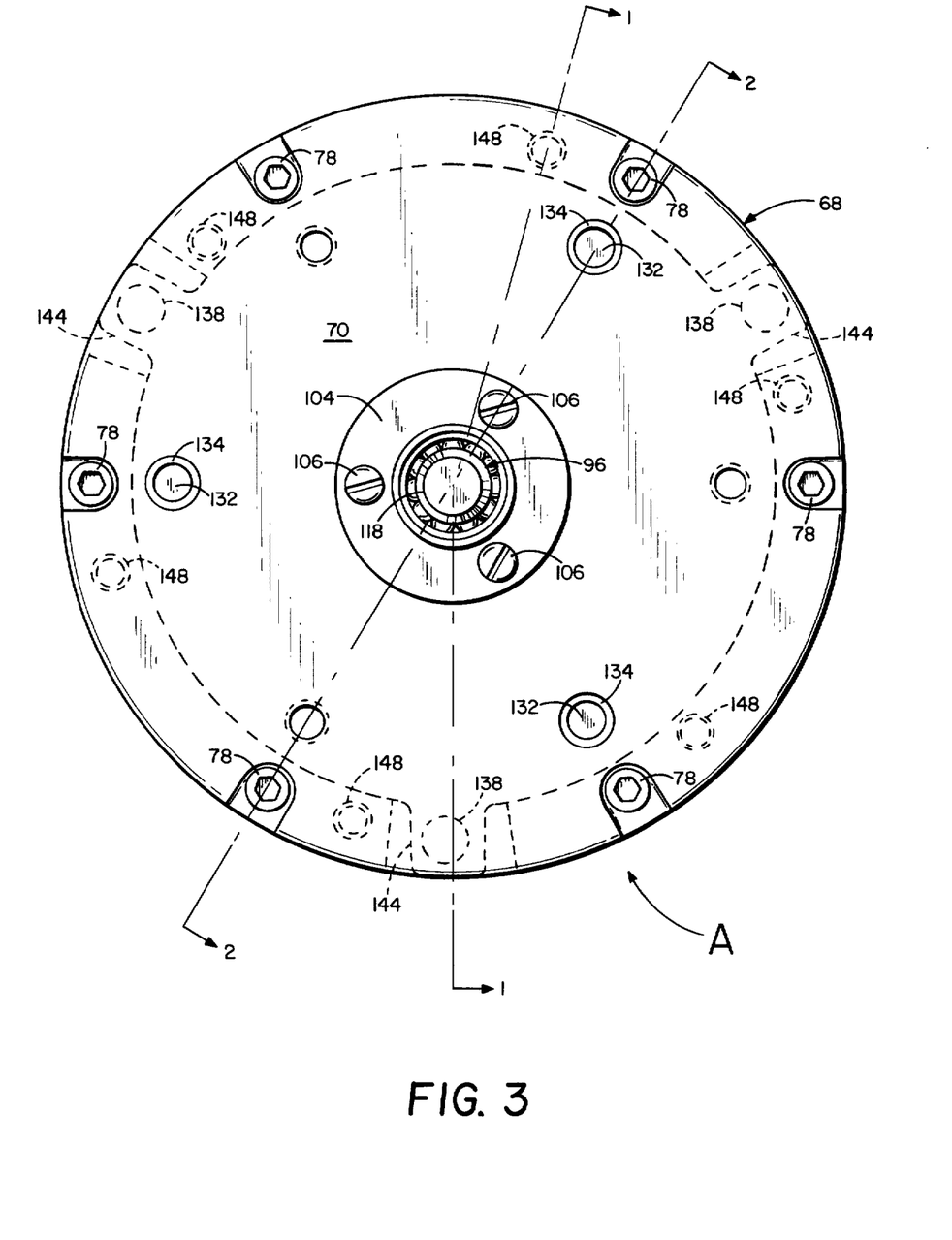
FIG. 3 is an end view of the clutch with the fluid line removed.

Referring to the drawings in detail and with particular reference to FIGS. 1-3, the fluid engaged spring released clutch A includes the annular mount 12 including the annular flange 14 which is formed with a series of spaced holes 16 for bolting the annular mount to the sheave 18 by means of bolts 20. A driven member in one form of the sheave 18 is secured to the live stub shaft 22 which is rotated by conventional mechanism (not shown) within the engine block E whereby the sheave and mount are rotated. The flange 14 terminates radially inwardly in the hollow hub portion 24 formed with splines 26 thereon.

Further provided is a friction disc 28 having the circular main body portion 30 with the annular offset portion 32 which terminates in the annular friction engageable foot portion 34. The hub portion of the disc 28 is formed with the axial hollow hub 37 formed with internal splines 38 in engagement with the splines 26 of the hub portion 24. The mount 12 is secured in splined relationship to the body portion 30 of the friction disc 28 by means of the axially mounted bolt 40 threadedly engaged in the clamping disc 42 through the axial hole 44 of the hub 24.

The disc 42 has an annular flange portion 46 in secure engagement with an annular recess 48 formed in the body portion 30. The hub 37 is formed with an external annular recess 50, and the housing hub 52 is formed with a companion annular recess 54 with the inner race 56 of bearing 58 press fit in the recess 50 and the outer race 60 press fit in the recess 54. The bearing 58 is retained by means of the retaining ring 59.

The above-referred to hub 52 is part of a first outer shell section 62 with the hub 52 terminating in the annular and radially extending body portion 64 which terminates in the offset portion 66. The elements indicated by numerals 12-66 form a modular unit M useable with either fan clutch described herein and the module is to the left of the broken line L in FIGS. 1, 2, 4 and 5. The numeral 68 designates a second outer shell section which includes the annular main body portion 70 formed with the axial hole 72 of hub 73 terminating outwardly in the annular recess 74. The main body portion 70 terminates radially outwardly in the right angular flange 76.

The first outer shell housing 62 is secured to the second outer shell housing 68 by means of the spaced bolts 78. The numeral 80 designates an annular piston including the circular and center body portion 82 which terminates in the outwardly offset and radially disposed annular flange portion 84 on the inner surface of which is mounted the friction ring 86 in axial alignment with the engageable foot portion 34 of the friction disc 28.

The inner annular surface 88 of the annular flange 84 forms a cylinder surface, and formed internally of the main body portion 70 of the shell housing 68 is the annular flange portion 90 slideably positioned relative to the surface 88 of the flange 84. On the outer surface of the portion 90 is formed the annular recess 92 in which is positioned the O-ring 94 in sealing engagement with the surface 88 of the flange 84 thereby forming a cylinder void C.

Positioned within in the axial hole 72 is the rotary air union 96 which includes the substantially cylindrical body 98 having the annular shoulder 100 which fits in the annular recess 74 and sealed by the O-ring 102. The rotary air union is secured in the axial hole 72 and annular recess 74 by means of the circular flat ring 104 secured upon the outer surface of the body portion 70 of the second shell section 68 by means of spaced bolts 106 and in abutment with and upon the annular shoulder 100 of the air union 96. Further included in the air union body 98 is the axial hole 108 in the inner closed end of which is the coil spring 110. The coil spring abuts a washer 112 particularly FIG. 2, which in turn abuts the O-ring 114 abutting the face seal 116 formed with the axial hole 117 which rotates with the shell section 68.

Contacting the end of the face seal 116 is the stationary air union portion 118 formed with the axial hole 120 which terminates in the right angularly disposed hole 122 connected by the union 124 to the fluid supply line 126. The axial hole 108 of the rotary air union communicates with the conduit 128 which in turn communicates with the cylinder C. The air union portion 118 has mounted thereon the bearing 130, see FIG. 2, and within the air union body 98 whereby the entire clutch A may rotate about the stationary air union portion 118.

Further provided are a series of spaced torque pins 132 slideably mounted on one end in the bushing 134 which bushing is secured by press fitting in the body portion 70 of the second shell section 68. The other end of the torque pin is secured in a hole 136 formed in the flange portion 84 of piston 80. The numeral 138 designates one of a series of spaced return springs mounted on one end in a hole 140 formed in the offset portion 66 of the first outer shell section 62. The other end of a return spring 138 is mounted in a recess 142 formed in the tab 144 within the void indicated in broken lines in FIG. 3, and formed in the outer periphery of the flange portion 84 of the piston 80. It will be seen that the springs 138 normally urge the piston and friction facing ring 86 thereon from friction foot portion 34 of the friction disc 28.

The numeral 148 designates one of a series of bolts each threadedly engaged in the outer periphery of first shell section 62 and each extended through a hole in the spider hub portion 150 of a circular multiple arm spider unit from which the fan blades 152 extend radially.

In operation of the clutch A and assuming the sheave 18 is being rotated by conventional means hereinbefore referred to, the blades 152 are rotated about the axis of the unit by introducing fluid pressure through rotary air union 96, through the conduit 128 and into the cylinder C which forces the piston 80 in the direction of the arrows in FIG. 1 whereby the friction ring 86 engages the foot portion 34 of the friction disc 28. As a result of the above, which is contrary to the urging of the springs 138, the jointed outer shell portion with the fan blades thereon are rotated. With the fluid pressure released, the springs 138 urge the friction ring 86 from engagement with the foot portion 34 of the friction disc 28 whereby the fan blades 152 cease to rotate. It will be noted that the construction allows a single bearing which provides rigidity which braces the outer race 60 of the bearing 58 by supporting the outer shell through the engagement of the friction disc 28 and friction facing 86 by directing load forces to the friction disc which in turn is directly connected to the rigid support which is the shaft that mounts the entire clutch unit.

Figure 4:
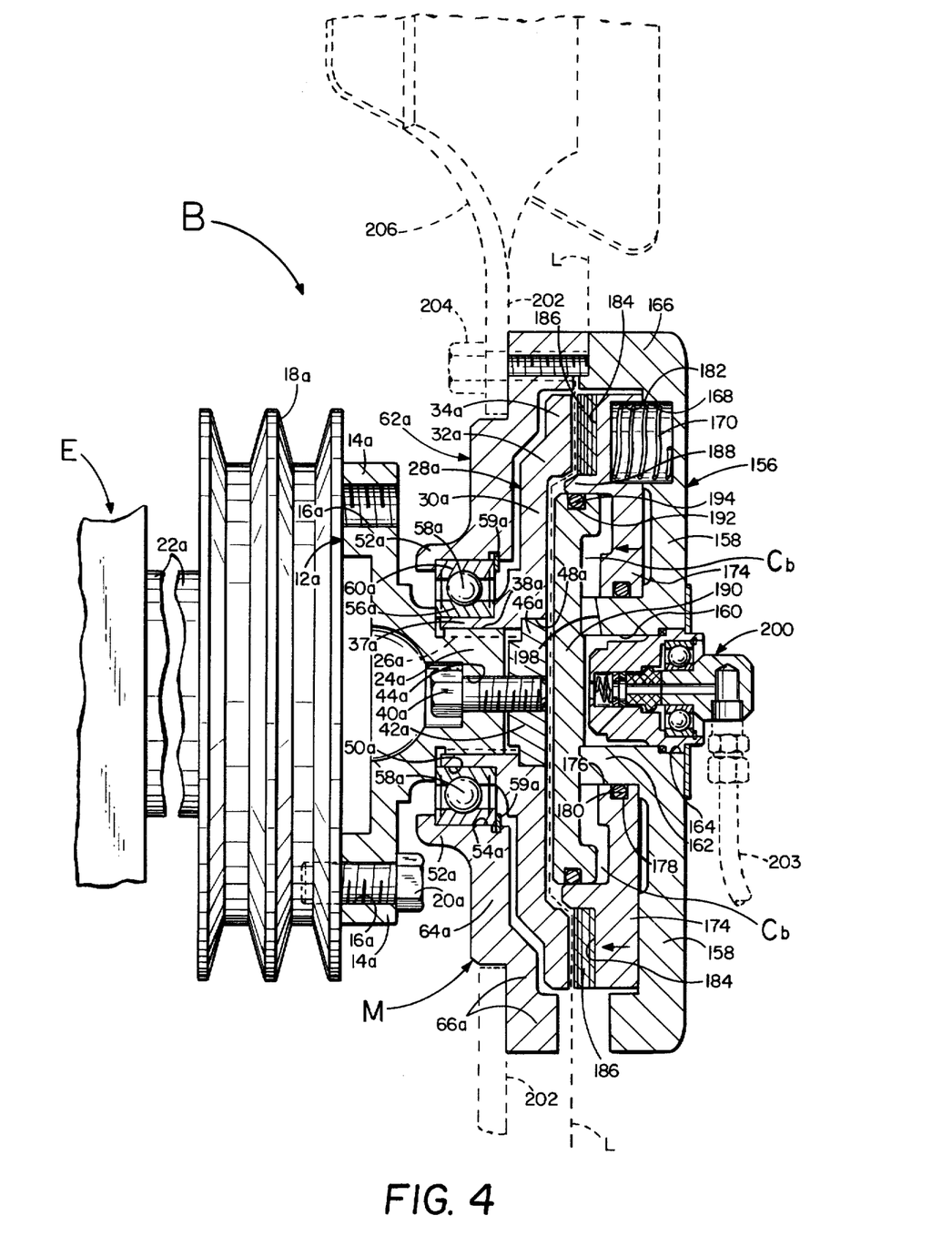
FIG. 4 is a sectional view on the line 4—4 of FIG. 6 of an alternative adaptive form of the fan clutch of FIGS. 1-3, specifically a spring-engaged fluid released fan clutch shown in a disengaged condition.
Figure 5:
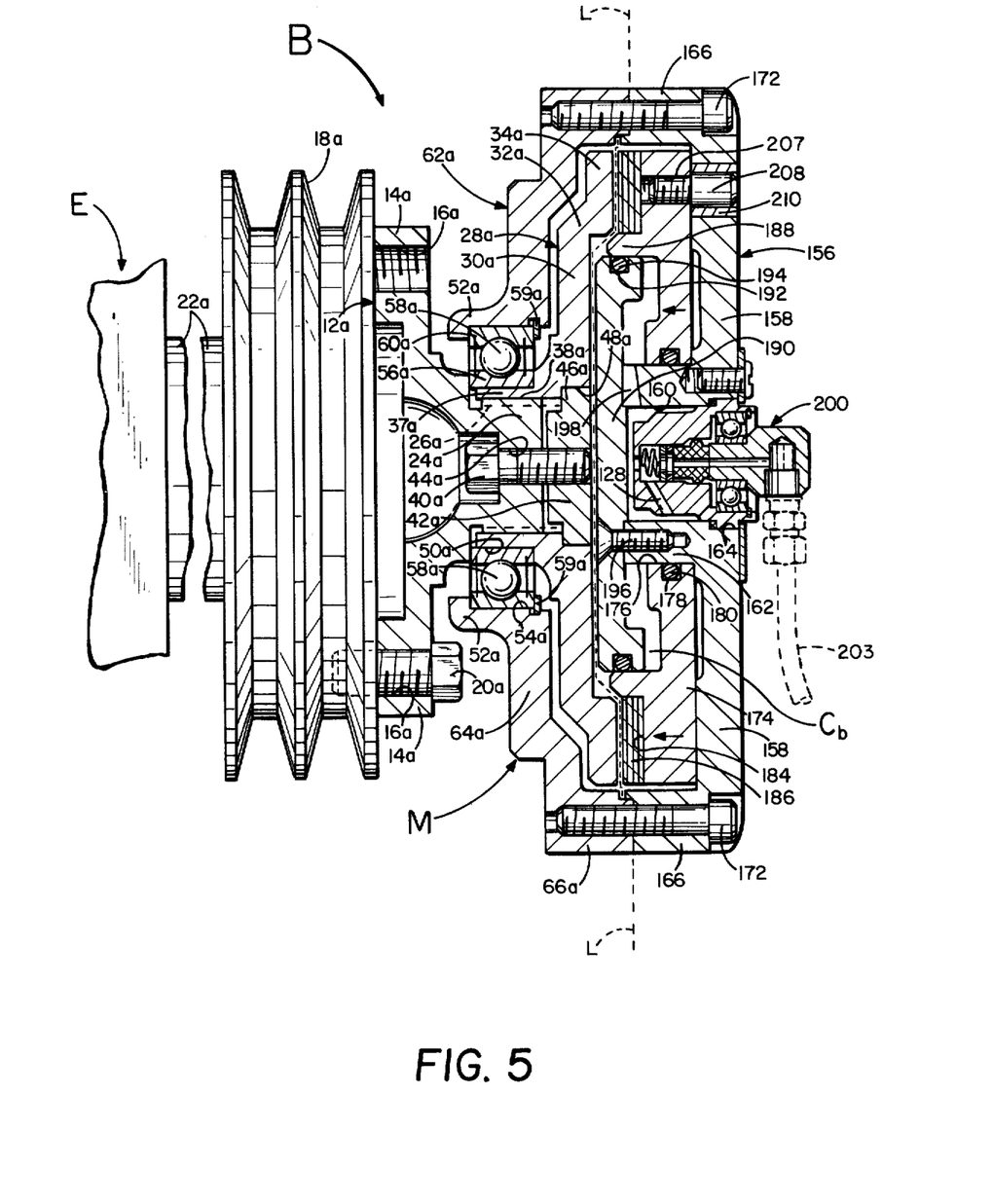
FIG. 5 is a sectional view on the line 5—5 of FIG. 6 with the clutch shown in a disengaged condition.
Figure 6:
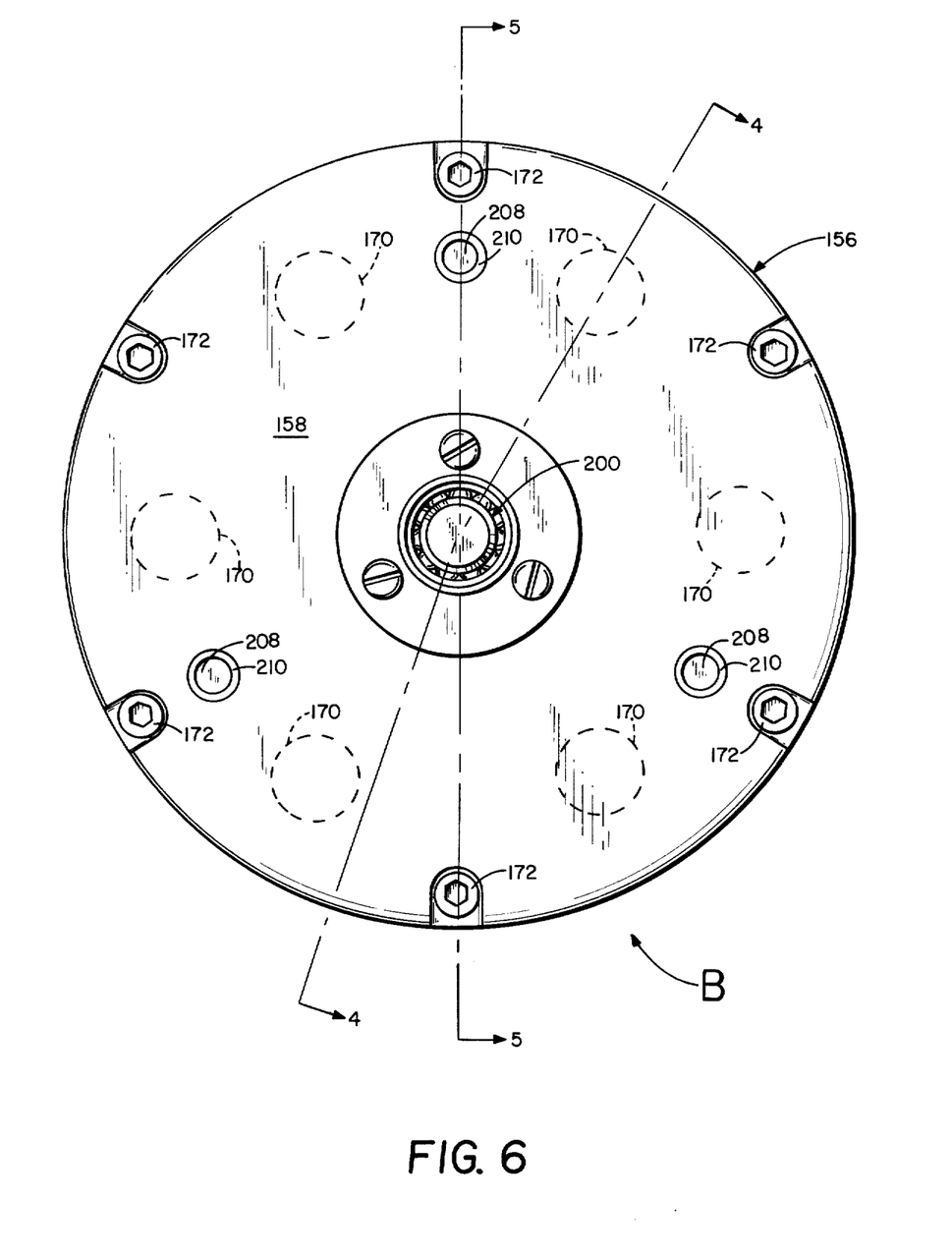
FIG. 6 is an end view of the clutch construction of FIGS. 4-5 with the fluid line removed.

With reference to FIGS. 4, 5 and 6 the following elements form a module unit M useable with the clutch of FIGS. 1-3 or that of FIGS. 4-6 and the elements of the module unit are identical to those found in FIGS. 1-3 with identical reference numerals accompanied with a lower case letter a. FIGS. 4-6 disclose a spring engaged fluid released clutch B. The mount 12a, the annular flange 14a, the holes 16a, the sheave 18a, the bolts 20a, the stub shaft 22a, the hub portion 24a, the splines 26a, the friction disc 28a having the circular main body portion 30a with the annular offset portion 32a which terminates in the annular friction engageable foot portion 34a. Additional identical elements are found in the hollow hub portion 37a of the friction disc 28a having the internal splines 38a in engagement with the splines 26a of the hub portion 24a with the mount 12a secured in splined relationship to the body portion 30a of the friction disc 28a by means of the axially mounted bolt 40a threadedly engaged in the clamping disc 42a through the axial hole 44a of the hub 24a. Further included in identical elements of the module unit is the disc 42a having the annular flange portion 46a in secure engagement with the annular recess 48a formed in the body portion 30a.

With further reference to FIGS. 4, 5 and 6, the hub 37a is formed with an external annular recess 50a, the housing hub 52a is formed with a companion annular recess 54a with the inner race 56a of bearing 58a press fit in the recess 54a. The bearing 58a is retained by means of the retaining ring 59a. The aforementioned hub 52a is part of a first outer shell section 62a with the hub 52a terminating in the annular and radially extending body portion 64a which terminates in the offset portion 66a. The description to this point of FIGS. 4-6 is of elements found in the spring engaged fluid released clutch B identical to those elements found in FIGS. 1-3 which elements form the module unit M hereinbefore referred to and having such a construction that the same is useable with either clutch A or clutch B.

Clutch B in addition to the identical module unit M heretofore described includes the second outer shell section 156 including the annular main body portion 158 formed with the axial hole 160 of hub portion 162 terminating outwardly in the annular recess 164. The main body portion 158 terminates radially outwardly in the right angular flange 166, and the body portion 158 is formed on the inner surface thereof a multiplicity of spaced holes 168 in each of which is positioned a coil spring 170. The second outer shell section 156 is secured to the first outer shell section by means of a series of spaced bolts 172.

The numeral 174 designates an annular slideable piston having an axial opening 176 in which is formed an annular recess 178 in which is positioned the O-ring 180 is slideable sealing contact with the outward surface of the hub 162. Formed in the outer surface of the piston 174 adjacent the outer periphery are a multiplicity of spaced holes 182 in which one end of each of the springs 170 is positioned. Formed on the inner surface of the piston 174 substantially opposite the spring holes 182 is an annular recess 184 in which is secured the ring 186 of friction material engageable with the annular foot portion 34a of the friction disc 28a as hereinafter described.

The recess 184 of piston 174 forms an annular flange 188 within which is positioned the circular plate 190. The outer periphery of the plate 190 is formed with a recess 192 in which is positioned the O-ring 194 which makes sealing contact with the slideable piston 174. The stationary plate 190 is secured to the hub 162 by a series of spaced bolts 196, particularly FIG. 5, and the hub 162 has formed therein the fluid conveying hole 198 leading from the inside of the hub 162 to the cylinder Cb formed by the void between the plate 190 and the piston 174.

Secured within the axial hole 160 and the adjacent recess 164 is the rotary air union 200 identical to the union 96 of FIGS. 1 and 2 with the fluid supply line 202 connected to the air union 200. Secured to the side of the outer periphery of the first outer shell section 62a is a spider ring 202 by means of the bolts 204 and extending radially outwardly from the ring 202 are a multiplicity of fan blades 206. Further provided are a series of spaced torque pins 208 slideably mounted on one end in the bushing 210 which bushing is secured by press fitting in the body portion 158 of the second shell section 156. The other end of the torque 208 is secured in a hole 207 formed in the flange portion 188 of piston 174.

In operation of the clutch B and assuming the sheave 18a is being rotated by conventional means hereinbefore referred to the blades 206 are rotated about the axis of the clutch unit B due to the springs 170 urging the piston 174 in the direction of the arrows of FIG. 4 whereby the friction ring 186 engages the rotating annular friction foot 34a.

When it is desired to stop the rotation of the blades 206, fluid pressure is introduced through the line 202, through the air union 200, through the conduit 128, FIG. 5, and outwardly of the hole 198 and into the cylinder area Cb whereby the piston 174 is moved axially in a direction opposite the direction of the arrows in FIG. 4 thereby taking the friction ring 186 out of engagement with the friction foot 34a. Thus, the clutch B is spring engaged and fluid disengaged and the module unit M, hereinbefore referred to, is useable very simply and economically to make up either clutch A or clutch B depending upon the desire and needs of the user.

Having thus described the invention, what is claimed as new and desired to be secured by Letters Patent is:

1. Modular mount connected to a clutch portion, with the clutch portion being one of a fluid engaged spring released clutch portion and a spring engaged fluid released clutch portion comprising, in combination: a rigid friction disc; a first outer shell section; means for rotatably mounting the first outer shell section with respect to the friction disc; with the clutch portions comprising, in combination: a second outer shell section; a piston; means for reciprocably mounting and rotatably relating the piston to the second outer shell section, with the piston including an annular flange having an inner cylindrical surface; a friction ring mounted to the annular flange of the piston; means within the second outer shell section for causing the piston to slideably move and move the friction ring thereon to contact with the friction disc and thereby cause the first and second shell sections to be rotatably related to the friction disc; means within the second outer shell section for causing the piston to slideably move and remove the friction ring thereon out of contact with the friction disc and thereby cause the first and second shell sections to be rotatably independent from the friction disc; means for interconnecting the second outer shell section with the first outer shell section for supporting the second outer shell section and the clutch portion components mounted thereon solely by the first outer shell section.

2. The modular mount of claim 1 further comprising, in combination: a driven hub portion for connection with a driven member, with the friction disc further including a hub portion; means for connecting the hub portion of the friction disc on the hub portion of the driven member; with the first outer shell housing further including a hub portion; and wherein the means for rotatably mounting the first outer shell section with respect to the friction disc comprises a bearing mounted between the hub portion of the friction disc and the hub portion of the first outer shell section and in alignment with the hub portion of the driven member.

3. The modular mount of claim 2 wherein the means for connecting the hub portion of the friction disc on the hub portion of the driven member comprises, in combination:
   (a) splines formed on the hub portion of the driven member in engagement with
   (b) splines formed on the hub portion of the friction disc, and
   (c) a bolt in engagement with the hub portion of the driven member and the friction disc.

4. The modular mount of claim 1 wherein the means for interconnecting the second outer shell section with the first outer shell section includes a series of spaced bolts.

5. The modular mount of claim 1 wherein the means for reciprocally mounting and rotatably relating the piston to the second outer shell section includes a series of spaced torque pins.

6. The modular unit of claim 1 further comprising, in combination: fan blades operatively carried by the first and second shell sections.

7. The modular mount of claim 1 wherein the fluid engaged spring released clutch portion includes an annular cylinder having an outer surface and formed in the second outer shell section, with the inner cylindrical surface of the piston being slideably mounted on the outer surface of the annular cylinder, with the piston having a circular, center body portion which terminates in the annular flange, with the means for causing the piston to move and move the friction ring to contact the friction disc comprising: a pressure cylinder formed between the second outer shell section and the piston, and means for providing fluid pressure into the pressure cylinder for moving the piston.

8. The modular mount of claim 1 wherein the spring engaged fluid released clutch portion includes a cylindrical plate having a periphery; means for securing the cylindrical plate to the second shell housing in a spaced relation; with the inner cylindrical surface of the piston being slideably mounted on the periphery of the cylindrical plate for reciprocation between the cylindrical plate and second outer shell section, with the means for causing the piston to move and move the friction ring to contact the friction disc comprising: springs located between the piston and the second outer shell section, and with the means for causing the piston to move and move the friction ring out of contact with the friction disc comprising: a pressure cylinder formed between the cylindrical plate and the piston, and means for providing fluid pressure into the pressure cylinder for moving the piston.

9. The modular mount of claim 8 wherein the second outer shell housing includes a hub; and wherein the means for providing fluid pressure into the pressure cylinder includes a rotary union received in the hub of the second outer shell housing.

10. The modular mount of claim 8 wherein the second outer shell housing includes a hub; wherein the piston of the spring engaged fluid released clutch portion includes an axial opening, with the axial opening of the piston being reciprocally mounted on the hub of the second outer shell housing, and wherein the means for securing the cylindrical plate to the second shell housing includes means for securing the cylindrical plate to the hub of the second shell housing.

11. A spring engaged fluid released clutch comprising, in combination: a friction disc; a shell housing; means for rotatably mounting the shell housing with respect to the friction disc; a cylindrical plate having a periphery; means for securing the cylindrical plate to the shell housing in a spaced relation; a piston having an annular flange including an inner cylindrical surface; means for reciprocably mounting the piston between the cylindrical plate and the shell housing, with the inner cylindrical surface of the annular flange of the piston being positioned on the periphery of the cylindrical plate to form a pressure cylinder between the cylindrical plate and the piston; a friction ring mounted to the annular flange of the piston; spring means for biasing the piston toward the cylindrical plate and causing the friction ring to contact the friction disc and thereby cause the shell housing to be rotatably related with the friction disc; and means for providing fluid pressure into the pressure cylinder for moving the piston against the spring means and causing the friction ring to move out of contact with the friction disc and thereby cause the shell housing to be rotatably independent from the friction disc.

12. The spring engaged fluid released clutch of claim 11 wherein the piston reciprocably mounting means includes a hub formed on the shell housing, and an axial opening formed in the piston for receipt on the hub of the shell housing; wherein the cylindrical plate securing means inculdes means for securing the cylindrical plate to the hub of the shell housing; and wherein the fluid pressure receiving means includes a rotary fluid union located within the hub of the shell housing.

13. A fluid engaged spring released clutch comprising, in combination: a friction disc; a shell housing; means for rotatably mounting the shell section with respect to the friction disc; an annular cylinder having an outer surface and formed in the shell section; a piston having a circular, center body portion terminating in an annular flange including an inner cylindrical surface; with the inside surface of the annular flange being reciprocably received and mounted on the annular cylinder to form a pressure cylinder between the shell housing and the piston; a friction ring mounted to the annular flange of the piston; spring means for biasing the piston on the annular cylinder and causing the friction ring to move out of contact with the friction disc and thereby cause the shell housing to be rotatably independent from the friction disc; and means for providing fluid pressure into the pressure cylinder for moving the piston against the biasing means and causing the friction ring to contact the friction disc and thereby cause the shell housing to be rotatably related with the friction disc.

* * * * *